(12) United States Patent
Hanks et al.

(10) Patent No.: US 6,744,712 B2
(45) Date of Patent: Jun. 1, 2004

(54) OPTICAL DISC DRIVE WITH SATELLITE BEAMS FOR GENERATION OF QUADRATURE ERROR SIGNALS FOR RADIAL POSITION DETECTION

(75) Inventors: D. Mitchel Hanks, Fort Collins, CO (US); Kevin L Colburn, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 09/772,746

(22) Filed: Jan. 29, 2001

(65) Prior Publication Data

US 2002/0101801 A1 Aug. 1, 2002

(51) Int. Cl.[7] .................................................. G11B 7/00

(52) U.S. Cl. ................................ 369/44.37; 369/53.23; 369/44.41

(58) Field of Search ............................ 369/44.35, 44.37, 369/44.26, 44.41, 53.23, 53.28

(56) References Cited

U.S. PATENT DOCUMENTS

| | | | | |
|---|---|---|---|---|
| 5,159,589 A | | 10/1992 | Ohsato | 369/44.35 |
| 5,191,571 A | * | 3/1993 | Fukumoto et al. | 369/44.37 |
| 5,212,675 A | * | 5/1993 | Yoshino et al. | 369/44.37 |
| 5,272,686 A | * | 12/1993 | Shigemori | 369/44.34 |
| 5,303,216 A | * | 4/1994 | Shinoda et al. | 369/44.37 |
| 5,671,199 A | * | 9/1997 | Nishikawa | 369/44.37 |
| 5,784,345 A | * | 7/1998 | Maeda et al. | 369/44.37 |
| 5,815,473 A | * | 9/1998 | Takahashi et al. | 369/44.37 |
| 5,892,744 A | * | 4/1999 | Ohba | 369/44.37 |
| 5,909,416 A | * | 6/1999 | Matsui | 369/44.37 |
| 6,128,259 A | * | 10/2000 | Sofue et al. | 369/44.37 |
| 6,388,963 B1 | * | 5/2002 | Tanaka | 369/44.37 |

* cited by examiner

Primary Examiner—Doris H. To
Assistant Examiner—Jorge L Ortiz Criado
(74) Attorney, Agent, or Firm—Augustus W. Winfield

(57) ABSTRACT

In an optical disc drive, signals from two satellite spots are used to cancel DC offset from a tracking error signal, and for generating a quadrature signal for determining direction of radial movement. The two satellite spots generate signals that are out of phase with the main tracking error signal by about one-fourth period.

4 Claims, 3 Drawing Sheets

OPTICAL DISC DRIVE WITH SATELLITE BEAMS FOR GENERATION OF QUADRATURE ERROR SIGNALS FOR RADIAL POSITION DETECTION

FIELD OF INVENTION

This invention relates generally to optical disc drives used for data storage, and more specifically to signals used for determining radial position of an optical head.

BACKGROUND OF THE INVENTION

In optical disc drives, for example drives for Compact Discs (CD) and Digital Versatile Disc (DVD), one or more light beams (typically from a laser diode), illuminate one or more spots on the disc, and are reflected back into an optical head. For optical media with lands and grooves, the reflectivity of the disc surface changes when the laser illuminates a land, versus a groove. Similarly, for optical media with pitted data, the reflectivity of the disc surface changes when the laser illuminates the data tracks, versus space between data tracks.

Typically, an optical detector assembly in the optical head provides multiple signals. It is common for an optical detector to have multiple segments, and for multiple signals to be generated as sums or differences of signals from individual segments. It is also common to have multiple detectors, each of which has multiple segments, within one assembly.

In general, the following signals are required: a data signal, a focus error signal, and a tracking error signal. The tracking error signal indicates whether the laser spot is centered on a data track. In general, a drive must also be able to detect track crossings as the optical head sweeps radially across tracks. One inexpensive approach is to detect peaks or zero-crossings of the tracking error signal as the optical head sweeps radially. If errors occur, a re-seek may be required. To reduce errors, it is desirable to have a signal that indicates direction of radial movement.

It is common in control systems to generate two periodic signals, each having the same period, that are out of phase by one-fourth of a period (called quadrature), and to combine information from the two signals to provide both position information and direction of movement. It is common in optical disc drives to generate two quadrature signals as a function of radial movement. Typically, the tracking error signal is approximately a sinusoidal waveform, which has a magnitude of zero when the spot is centered on a data track, and increases when off-track in one direction and decreases when off-track in the other direction. As one alternative for generating a separate radial tracking signal for quadrature, one can differentiate the tracking error signal to provide a signal that is out of phase by one-fourth period. However, differentiation is frequency dependent, sensitive to noise, and does not work well with slow radial movement. Another alternative for generating a separate radial tracking signal for quadrature is to use a low-pass filtered version of the data signal (also known as a tracking contrast signal). For some media, when the optical head is swept radially across tracks, the tracking contrast signal is also approximately a sinusoid, with a peak magnitude when centered over data, and decreasing when off-track from the center of data. If the center of a data track is the reference position for radial movement, then the tracking error signal is approximately a sine wave, and the tracking contrast signal is approximately a cosine signal. Accordingly, the tracking error signal and the tracking contrast signal can be used as two quadrature signals for determining radial position and direction of movement. However, for phase-change rewriteable media, if no data has been written, a tracking contrast signal may not be suitable.

Within the optical head, a radial position adjuster may provide fine movement of a lens to radially adjust the position of the focused laser spot. When the objective lens is displaced from a nominal center position, it may result in a DC offset in the tracking error signal (one common term for the phenomena is "beamwalk"). Radial tilt of the disc may also cause a DC offset in the tracking error signal. There may also be other contributors to a DC offset in the tracking error signal.

One known solution to the problem of DC offset in the tracking error signal is 3-spot tracking (also called differential push-pull, or DPP), in which two satellite illumination spots are positioned so that each of the satellite spots provide a signal that is 180 degrees out of phase with a main spot. The satellite spots are also subject to DC offset. Signals from the satellite spots are added together, the sum is multiplied by a suitable multiplier, and the result is subtracted from the signal from the main spot. As a result, the DC offsets from the signals from the satellite spots are subtracted from the DC offset of the signal from the main spot. In the following example equations, it is assumed that the signal magnitude from the main spot is ten times the signal magnitude from the satellite spots.

Main spot signal=$MS=\sin(\omega x)$+Offset (where x is a radial distance and $\omega$ is a function of track pitch)

Right satellite spot signal=$RS=0.1[-\sin(\omega x)+$Offset$]$

Left satellite spot signal=$LS=0.1[-\sin(\omega x)+$Offset$]$ $MS-5(RS+LS)=$ $\sin(\omega x)+$Offset$-5\{0.1[-\sin(\omega x)+$Offset$]+0.1[-\sin(\omega x)+$Offset$]\}=$ $2\sin(\omega x)$ From the above, DPP can provide a tracking error signal with no DC offset.

It is also known to provide two satellite spots positioned to provide a signal that is out of phase with a track crossing signal by one-fourth of the period. See, for example, U.S. Pat. No. 5,159,589 (Ohsato). In Ohsato, the main spot provides a sine signal, the satellite spots provide cosine signals, and the sine signal is divided by a sum of the cosine signals, resulting in a tangent function. The quotient of the two signals eliminates amplitude sensitivity because amplitude changes affect both the sine and cosine signals by the same proportion.

There is a general need, for elimination of DC offset in a tracking error signal, and for generating a signal that provides direction of movement for radial track crossing. There is a particular need for elimination of DC offset and generation of quadrature signals for phase-change rewriteable media, which may not have any data written on the disc.

SUMMARY OF THE INVENTION

In drives in accordance with the invention, signals from two satellite spots are used to cancel DC offset from a tracking error signal, and for generating a quadrature signal for determining direction of radial movement. In contrast to DPP, the two satellite spots generate signals that are out of phase with the main tracking error signal by approximately one-fourth period, as in Ohsato. In contrast to Ohsato, the signals from the satellite spots are used to provide DC offset information and a quadrature signal.

DETAILED DESCRIPTION OF THE PREFERRED EMBODIMENT OF THE INVENTION

Figure 1:
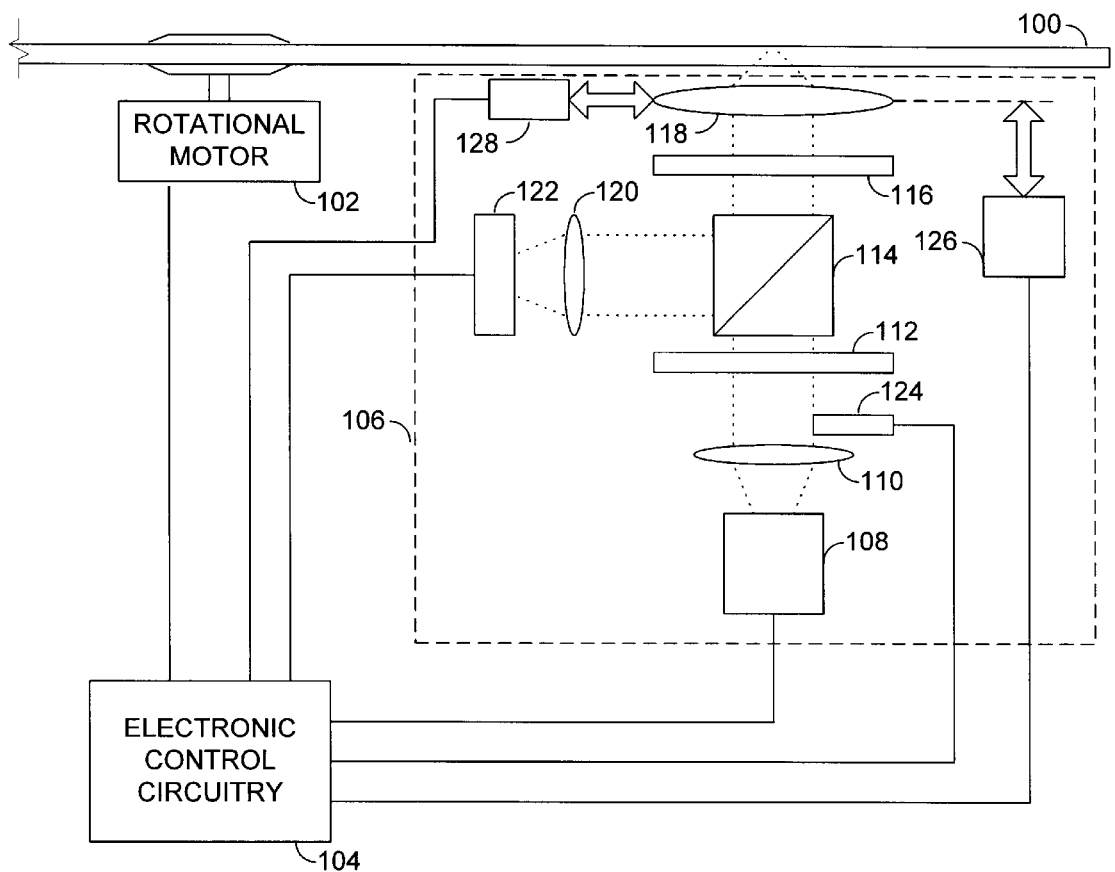
FIG. 1 is a cross section of an example of an optical head producing a main spot and satellite spots in accordance with the invention.

In FIG. 1, an optical disc drive is used to read from, and write to, an optical disc 100. The optical disc drive includes a motor 102 for rotating the disc 100, electronic control circuitry 104, and an optical transducer assembly 106. A laser diode 108 emits a linearly polarized beam of light which is collimated by a collimator lens 110. The collimated light passes through a grating 112, which divides the light beam into three beams: a center beam, and two satellite beams. The three light beams pass through a polarization beam splitter 114. The light beams are converted from linear polarization to circular polarization by a quarter-wave retardation plate 116. The light beams are focused by an objective lens 118 onto a recording layer of the optical disc 100. A portion of the light is reflected by the optical disc 100 and returns through the objective lens 118 and the quarter-wave retardation plate 116. Upon passing back through the quarter-wave retardation plate 116, the light is again linearly polarized. However, the polarization direction of the light beam is rotated 90 degrees relative to its initial polarization direction. Therefore, the polarization beam splitter 114 reflects substantially all of the returning light beam towards a lens 120 and a photodetector assembly 122. Photodetector assembly 122 is illustrated in more detail in FIG. 3. A focus mechanism 126 moves the objective lens 118 (toward or away from the optical disc 100) to control the focus of the light spot on the recordable layer. A radial position adjuster 128 provides fine movement of the lens 118 to radially adjust the position of the focused laser spot. For coarse radial positioning of the laser spot, the entire transducer assembly 106 is moved.

Figure 2:
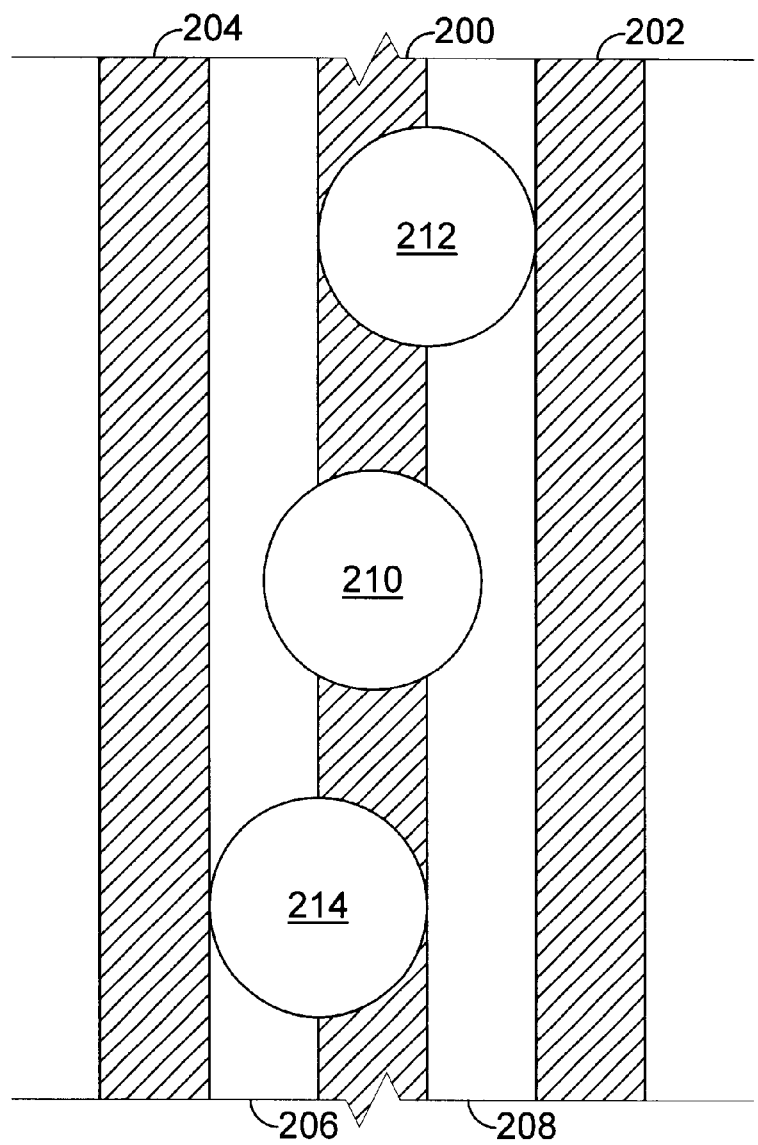
FIG. 2 is a plan view of an optical disc with lands and grooves being illuminated by a main spot and satellite spots in accordance with the invention.

FIG. 2 illustrates an optical disc with lands (200, 202, and 204) and grooves (206 and 208). For purposes of the invention, it does not matter whether data is recorded on the lands, in the grooves, or both. Also illustrated in FIG. 2 are three focused spots of light, a central spot 210, and two satellite spots (212, 214). There may be more than two satellite spots. The intensity of the satellite spots may be different than the intensity of the central spot. The radial spacing between the centers of the spots of light is about one-fourth of the pitch of the lands (or grooves).

Figure 3:
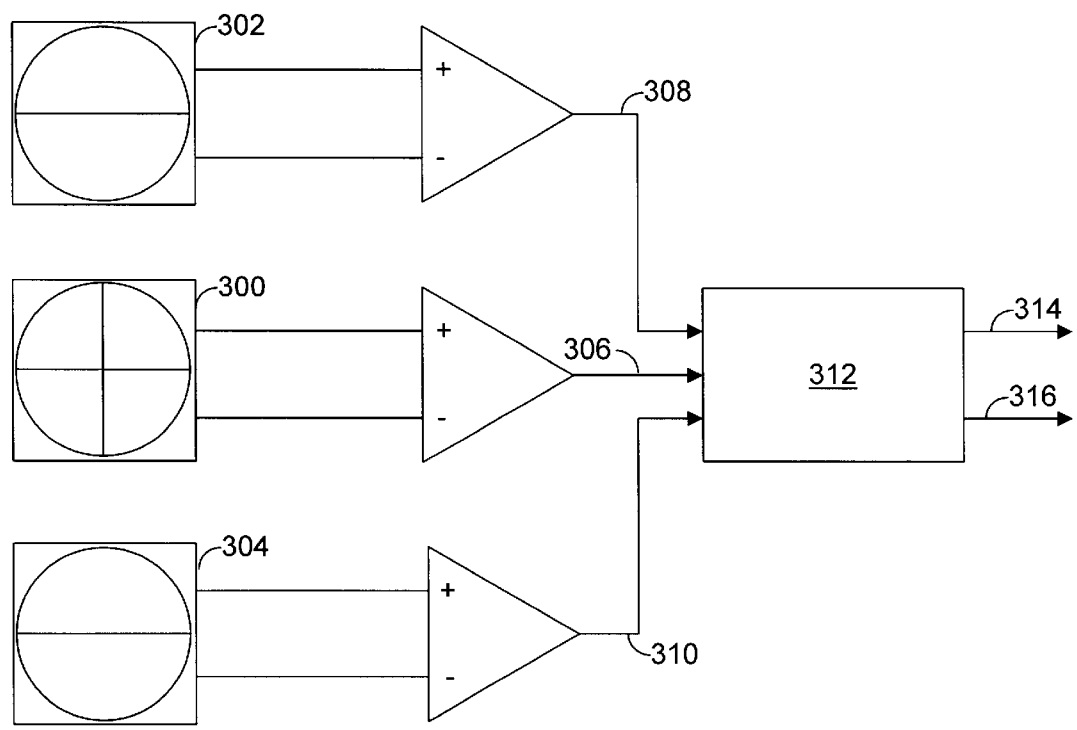
FIG. 3 is a block diagram illustrating sensors and electronics suitable for generating a tracking signal and a quadrature signal from the spots illustrated in FIG. 2.

FIG. 3 illustrates three multi-segment photosensors that are part of photosensor assembly 122 in FIG. 1. A quad-detector 300 receives light from the main spot (FIG. 2, 210), and detectors 302 and 304 receive light from the satellite spots (FIG. 2, 212, 214). Two signals from two halves of detector 300 are used to generate a main differential (also called push-pull) signal 306, that varies periodically with radial movement of the optical head. Signals from two halves of detectors 302 and 304 are used to generate satellite differential signals 308 and 310 that vary periodically with radial movement of the optical head. The quad-detector 300 may be also be used to generate a data signal (not illustrated) and a focus signal (not illustrated). The three differential signals (306, 308, 310) are combined by an arithmetic unit 312 to generate a tracking error signal 314, which is compensated for DC offset. Arithmetic unit 312 also generates a signal 316, which is offset in phase from the tracking error signal by about one-fourth period, and which is also compensated for DC offset. The two signals are computed as follows.

Main spot push-pull=MS =$\sin(\omega x)$+Offset (where x is a radial distance and $\omega$ is a function of groove pitch)

Right satellite push-pull=RS=$k[\cos(\omega x)$+Offset]

Left satellite push-pull=LS=$k[-\cos(\omega x)$+Offset ]

Compensated tracking error signal (314)=MS−m(RS+LS)=$\sin(\omega x)$+Offset−m{$k[\cos(\omega x)$+Offset]+$k[-\cos(\omega x)$+Offset]}=$\sin(\omega x)$+Offset−2mk(Offset)

The cosine terms cancel, and with k known, m can be chosen to essentially eliminate the offset term. That is, m=1/(2k). The resulting tracking error signal (314) has essentially no DC offset.

Similarly, RS and LS can be combined and compensated for DC offset, and used for the quadrature signal (316), as follows:

RS−LS=

$k[\cos(\omega x)$+Offset]−$k[-\cos(\omega x)$+Offset]=

$2k[\cos(\omega x)]$

Note that quadrature signals do not have to be precisely out of phase by one-fourth period. If, for example, the signals are out of phase by one-eighth period, then a resulting radial position error signal is not proportional to radial position error, but the radial position error signal will still indicate a non-linear radial position error with the correct sign. Typically, generation of satellite spots results in substantial variability in placement from optical head to optical head. However, this variability is acceptable. In particular, for purposes of the invention, for signal 316, if the phase offset relative to signal 314 is one-fourth period ±one-eighth period, performance is acceptable, and an even broader range may still be acceptable. For the tracking error signal, the cosine terms cancel and phase is not relevant.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating a radial tracking signal in an optical disc drive, comprising:

focusing at least three spots of light onto an optical disc, where a spacing between a center of the spots is about one-fourth of a pitch of tracks on the optical disc;

generating at least three signals, each signal generated from light reflected from the optical disc from one spot; and combining the signals to substantially eliminate a constant offset in magnitude in the signal from one of the spots.

2. The method of claim 1, wherein the spacing between the center of the spots has a an intended spacing of one-fourth of the pitch of tracks on the optical disc, with a range around the intended spacing.

3. The method of claim 1, wherein the spacing between the center of the spots is within the range of one-eighth to three-eighths of the pitch of tracks on the optical disc.

4. The method of claim 1, wherein the phase of the signal formed from the combination of signals from two of the spots is offset, relative to the phase of the signal from the third spot, within a range of one-eighth to three-eighths of the period of the signal from the third spot.

* * * * *